UNITED STATES PATENT OFFICE.

WILLIAM J. BLACK AND JOHN NEWTON BLACK, OF WASHINGTON, PENNSYLVANIA.

PAINT COMPOSITION.

1,225,105.  Specification of Letters Patent.  Patented May 8, 1917.

No Drawing.   Application filed September 15, 1916.  Serial No. 120,360.

*To all whom it may concern:*

Be it known that we, WILLIAM J. BLACK and JOHN NEWTON BLACK, citizens of the United States, residing at Washington, in the county of Washington and State of Pennsylvania, have invented certain new and useful Improvements in Paint Compositions, of which the following is a specification.

This invention has relation to composition paint, and has for its object to provide a paint composition without the use of white lead, zinc white, or other metallic carbonate of the more or less expensive metals, thereby resulting in the provision of an economical composition which is quite as satisfactory as the metallic paints.

Another object of the invention is to provide a composition paint embodying among it constituents, slaked lime, in place of white lead or the like, thereby greatly decreasing the cost of manufacture of the paint composition.

In addition to the foregoing objects, the present invention resides in the nature of the ingredients employed therein, or their equivalents, and proportions within the spirit of the invention or the scope of the appended claims.

In detail: The base of our paint composition is calcium oxid employed in the form of commercial slaked lime, which has been reduced to powder form and to 43 parts of which, crude oil is added in a proportion of 32 parts thereof. These ingredients are thoroughly mixed, and 4 parts of sal-ammoniac added thereto and the whole thoroughly mixed again. The last ingredient is turpentine of which 2½ parts are employed and added to the above mixture, and the whole again subjected to a thorough intermixing process. The mixture is afterward strained through a sieve preferably twice, and all of the lumps thereby removed, leaving a composition of the correct viscosity and covering ability.

The composition is employed in the manner of ordinary paint, and will be found to give as satisfactory results as a composition containing white lead, zinc white, or other metallic paint bases.

After the composition is sieved in the manner above set forth, the residue may be employed in the manner of putty to fill crevices before the above named paint composition is applied to a surface.

It is to be noted that each ingredient of this composition, is according to present standards relatively inexpensive particularly crude oil which is of especial value in this composition as an excipient. During the mixture of the ingredients, free ammonia is liberated from the sal-ammoniac due to the reaction with the slaked lime, and this free alkali promotes to a considerable extent the emulsification of the crude oil, thereby suspending the particles of lime and producing a composition which will not settle.

While we have set forth the composition of our improved paint with some particularity, we realize that in practice various alterations therein may be made and we therefore reserve the right and privilege of substituting equivalent ingredients for those named, or otherwise altering the proportions of the ingredients employed within the spirit of the invention and the scope of the appended claims.

Having thus described our invention what we claim as new and desire to secure by Letters Patent is:

1. A paint composition including slaked lime, crude oil, sal-ammoniac and turpentine.

2. A paint composition including 43 parts of slaked lime, 32 parts of crude oil, four parts of sal-ammoniac, and 2½ parts of turpentine.

3. The herein described process of making a paint composition which consists in reducing 43 parts of slaked lime to pulverulent form, adding thereto 32 parts of crude oil, and thoroughly mixing the same, then adding four parts of sal-ammoniac, again mixing the whole, finally adding 2½ parts of turpentine to the mixture, subjecting the same again to a thorough intermixture, and straining through a sieve to remove conglomerations.

In testimony whereof we affix our signatures in presence of two witnesses.

WILLIAM J. BLACK.
JOHN NEWTON BLACK.

Witnesses:
JOSEPH M. PRIGG,
LEWIS C. SONDEE.